(12) United States Patent
Nammi et al.

(10) Patent No.: US 9,867,059 B2
(45) Date of Patent: Jan. 9, 2018

(54) DISTRIBUTED NODE OPERATION IN HETEROGENEOUS NETWORKS

(71) Applicant: Telefonaktiebolaget L M Ericsson (publ), Stockholm (SE)

(72) Inventors: Sairamesh Nammi, Kista (SE); Cagatay Konuskan, Stockholm (SE); Namir Lidian, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 139 days.

(21) Appl. No.: 14/265,568

(22) Filed: Apr. 30, 2014

(65) Prior Publication Data

US 2015/0071112 A1 Mar. 12, 2015

Related U.S. Application Data

(60) Provisional application No. 61/874,632, filed on Sep. 6, 2013.

(51) Int. Cl.
   *H04W 16/18* (2009.01)
   *H04B 7/02* (2017.01)
   (Continued)

(52) U.S. Cl.
   CPC ............ *H04W 16/18* (2013.01); *H04B 7/024* (2013.01); *H04B 7/063* (2013.01)

(58) Field of Classification Search
   CPC ........ H04W 16/18; H04B 7/024; H04B 7/063
   See application file for complete search history.

(56) References Cited

U.S. PATENT DOCUMENTS

| 2011/0237272 A1* | 9/2011 | Gorokhov | H04B 7/024 455/452.1 |
| 2013/0121379 A1* | 5/2013 | Wang | H04L 5/0048 375/145 |

(Continued)

FOREIGN PATENT DOCUMENTS

| GB | 2496178 A | 5/2013 |
| WO | 2013066416 A1 | 5/2013 |

OTHER PUBLICATIONS

Author Unknown, "RP-121436: Proposed SID: Study on UMTS Heterogeneous Networks," Huawei, 3GPP, TSG RAN Meeting #57, Sep. 4-7, 2012, Chicago, IL., 5 pages.

(Continued)

*Primary Examiner* — Edan Orgad
*Assistant Examiner* — Jeremy Costin
(74) *Attorney, Agent, or Firm* — Withrow & Terranova, PLLC

(57) ABSTRACT

Systems and methods related to providing spatial reuse gain as well as Multiple-Input-Multiple-Output (MIMO) gains in a combined cell of a heterogeneous cellular communications network are disclosed. In one embodiment, a method of operation of a wireless device includes receiving node-specific pilot signals from transmission nodes in a combined cell, where each node-specific pilot signal is transmitted by a different transmission node in the combined cell. The method further includes generating channel measurements based on the node-specific pilot signals. The channel measurements include a separate channel measurement for each transmission node based on the node-specific pilot signal transmitted by the transmission node. The method further includes selecting a desired combination of nodes from the subset of the transmission nodes based directly or indirectly on the channel measurements and providing an indication of (Continued)

the desired combination of nodes to the central control node for the combined cell.

21 Claims, 14 Drawing Sheets

(51) Int. Cl.
*H04B 7/024* (2017.01)
*H04B 7/06* (2006.01)

(56) References Cited

U.S. PATENT DOCUMENTS

2013/0308590 A1* 11/2013 Ihm ..................... H04B 7/0632
  370/329
2013/0343301 A1* 12/2013 Geirhofer ............... H04L 5/001
  370/329
2014/0092787 A1* 4/2014 Han ..................... H04L 5/0055
  370/280

OTHER PUBLICATIONS

Author Unknown, "R1-124512: Initial considerations on Heterogeneous Networks for UMTS," Ericsson, 3GPP TSG RAN WG1 Meeting #70bis, Oct. 8-12, 2012, San Diego, CA, 7 pages.

Author Unknown, "R1-124513: Heterogeneous Network Deployment Scenarios," Ericsson, 3GPP TSG RAN WG1 Meeting #70bis, Oct. 8-12, 2012, San Diego, CA, 3 pages.

International Search Report and Written Opinion for International Patent Application No. PCT/IB2014/064321, dated Nov. 27, 2014, 9 pages.

International Preliminary Report on Patentability for International Patent Application No. PCT/IB2014/064321, dated Mar. 17, 2016, 8 pages.

* cited by examiner

DISTRIBUTED NODE OPERATION IN HETEROGENEOUS NETWORKS

RELATED APPLICATIONS

This application claims the benefit of provisional patent application Ser. No. 61/874,632, filed Sep. 6, 2013, the disclosure of which is hereby incorporated herein by reference in its entirety.

FIELD OF THE DISCLOSURE

The present disclosure relates to a heterogeneous cellular communications network and, in particular, to distributed node operation in a combined cell deployment of a heterogeneous cellular communications network.

BACKGROUND

Cellular operators have started to offer mobile broadband based on Wideband Code Division Multiple Access (WCDMA)/High Speed Packet Access (HSPA). Further, end user performance requirements are steadily increasing due, in part, to resource demands of data applications. The increase of mobile broadband users has resulted in heavy traffic volumes, and the demands placed on HSPA networks to handle such users have grown significantly. Therefore, techniques that allow cellular operators to manage their spectrum resources more efficiency are of great importance. However, since improvements in spectral efficiency per link are approaching theoretical limits, the next generation technology seeks to improve spectral efficiency per unit area. In other words, the next generation technology seeks to provide a uniform user experience to users anywhere inside a cell by changing the topology of traditional networks.

In this regard, the Third Generation Partnership Project (3GPP) is currently working on heterogeneous networks, as described in Ericsson et al., "R1-124512: Initial considerations on Heterogeneous Networks for UMTS," 3GPP, TSG RAN WG1 Meeting #70bis, Oct. 8-12, 2012, San Diego, Calif.; Ericsson et al., "R1-124513: Heterogeneous Network Deployment Scenarios," 3GPP, TSG-RAN WG1 #70bis, Oct. 8-12, 2012, San Diego, Calif.; and Huawei et al., "RP-121436: Proposed SID: Study on UMTS Heterogeneous Networks," 3GPP, TSG RAN Meeting #57, Sep. 4-7, 2012, Chicago, Ill. Traditional cellular communications networks are homogeneous networks. A homogeneous network is a network of base stations (e.g., Node Bs) in a planned single-layer layout in which all base stations have similar, or the same, transmit power levels, antenna patterns, receiver noise floors, and backhaul connectivity to the data, or core, network. Moreover, all base stations offer unrestricted access to user terminals in the network, and serve roughly the same number of user terminals. Some examples of cellular communications networks that traditionally have utilized homogeneous network layouts include, for example, Global System for Mobile communications (GSM) networks, WCDMA networks, High Speed Downlink Packet Access (HSDPA) networks, Long Term Evolution (LTE) networks, WiMax networks, etc.

In contrast, a heterogeneous network includes a number of macro, or high-power, base stations in a planned layout and a number of low-power base stations. One example of a heterogeneous network 10 is illustrated in FIG. 1. In FIG. 1, only one macro cell 12 is illustrated. However, the heterogeneous network 10 typically includes many macro cells 12. As illustrated, the heterogeneous network 10 includes a macro, or high-power, base station 14 serving the macro cell 12 and many low-power base stations 16 serving corresponding small cells 18. The low-power base stations 16 may include, e.g., micro base stations, pico base stations, femto base stations, and/or relay base stations. The transmit power of the low-power base stations 16 is relatively small as compared to that of the macro base station 14. For example, in some implementations, the transmit power of the low-power base stations 16 may be up to 2 Watts, whereas the transmit power of the macro base station 14 may be up to 40 Watts. The low-power base stations 16 are deployed to eliminate coverage holes in the macro layer (i.e., the layer of macro base stations 14), mitigate the shadow fading effect, and improve the capacity in traffic hot-spots. Due to their low transmit power and smaller physical size, the low-power base stations 16 can offer flexible site acquisitions.

Heterogeneous networks can be divided into two categories. In a first category, each of the low-power base stations 16 has a different layer 3 (L3) cell Identifier (ID) (and a different scrambling code), and the L3 cell IDs of the low-power base stations 16 are different than the L3 cell ID of the macro base station 14. One example of this first category is illustrated in FIG. 2. As shown in FIG. 2, the macro base station 14 and the low-power base stations 16 create different cells (Cell A, Cell B, and Cell C) having different cell IDs. In this case, the low-power base stations 16 provide load-balancing and, as a result, huge gains in system throughput and cell edge user throughput can be achieved. One disadvantage of this approach is that, since each low-power base station 16 creates a different cell, a user terminal (e.g., a User Equipment device (UE)) needs to do a soft handover when moving from the macro cell 12 to one of the small cells 18 or when moving from one small cell 18 to another small cell 18. Therefore, higher layer signaling is needed to perform these soft handovers.

In a second category, all of the low-power base stations 16 have the same L3 cell ID as the macro base station 14. In this category, the aggregate of the macro cell 12 and the small cells 18 is referred to as a combined cell, a soft cell, or a shared cell. As such, this second category is referred to as a combined cell deployment, a soft cell deployment, or a shared cell deployment. The terms "combined cell" and "combined cell deployment" are used herein. One example of a combined cell deployment of the heterogeneous network 10 is illustrated in FIG. 3. As shown in FIG. 3, the macro base station 14 and the low-power base stations 16 share the same cell ID such that, together, the macro base station 14 and the low-power base stations 16 serve a single combined cell (Cell A). The combined cell avoids the need for frequent soft handovers and the corresponding higher layer signaling.

A combined cell deployment typically uses one of two transmission modes, namely, a Single Frequency Network (SFN) transmission mode and a spatial reuse transmission mode. In the SFN transmission mode, all nodes (i.e., the macro base station 14 and the low-power base stations 16) transmit the same pilot channel, data, and control information. In this case, only one user terminal (which is some cases is referred to as a UE) can be served from all nodes at any time. Hence, the SFN transmission mode is useful for coverage improvement. Furthermore, the SFN transmission mode supports legacy user terminals (e.g., user terminals that do not support the spatial reuse transmission mode). FIG. 4 is a graphical illustration of the SFN transmission mode for one example of a combined cell in a HSPA network.

In the spatial reuse transmission mode, all nodes (i.e., the macro base station 14 and the low-power base stations 16) transmit the same pilot channel, but data and control information transmitted from one node is different from that transmitted from every other node, or at least one other node. In other words, one node will transmit data and control information for one user terminal while, at the same time, another node will transmit data and control information for another user terminal. In this manner, resources (e.g., spreading codes or channelization codes, scrambling codes, frequencies, etc.) can be spatially reused. The spatial reuse transmission mode provides load balancing gains and, as a result, the capacity of the combined cell can be significantly increased. FIG. 5 is a graphical illustration of the spatial reuse transmission mode for one example of a combined cell in a HSPA network.

In a combined cell deployment, the SFN transmission mode causes wastage of resources and does not provide capacity benefits when the load of the combined cell is high. The capacity of the combined cell can be increased using the spatial reuse transmission mode. However, only spatial reuse gains can be obtained in the spatial reuse transmission mode. As such, there is a need for systems and methods for increasing capacity (i.e., improving spectral efficiency) in a combined cell deployment of a heterogeneous network.

SUMMARY

Systems and methods related to providing spatial reuse gain as well as Multiple-Input-Multiple-Output (MIMO) gains (i.e., diversity gain and/or multiplexing gain) in a combined cell of a heterogeneous cellular communications network are disclosed. In one embodiment, a method of operation of a wireless device in a combined cell deployment of a heterogeneous cellular communications network is provided. In one embodiment, the method of operation of the wireless device includes receiving node-specific pilot signals from transmission nodes in a combined cell, where each node-specific pilot signal is transmitted by a different transmission node in the combined cell. The method further includes generating channel measurements based on the node-specific pilot signals. The channel measurements include, for each transmission node, a separate channel measurement generated based on the node-specific pilot signal transmitted by the transmission node. The method further includes selecting a desired combination of nodes from the subset of the transmission nodes based directly or indirectly on the channel measurements and providing an indication of the desired combination of nodes to the central control node for the combined cell.

In one embodiment, the desired combination of nodes is a desired combination of two or more nodes. In another embodiment, the desired combination of nodes is a desired combination of one or more nodes.

In one embodiment, the method of operation of the wireless device further includes providing the channel measurements to a central control node for the combined cell and, in response, receiving information from the central control node that is indicative of a subset of the node-specific pilot signals to be utilized by the wireless device. In this embodiment, selecting the desired combination of nodes includes selecting the desired combination of nodes from the subset of the transmission nodes.

Further, in one embodiment, selecting the desired combination of nodes includes estimating a channel capacity for each of a number of possible combinations of nodes from the subset of the transmission nodes, and selecting the possible combination having a highest channel capacity as the desired combination of nodes. In one embodiment, the possible combinations of nodes includes all possible combinations of $N_{RX,ANT}$ nodes from the subset of the transmission nodes, wherein $N_{RX,ANT}$ is a number of receive antennas of the wireless device and is greater than or equal to 2. In one embodiment, the possible combinations of nodes also includes all possible combinations of one node from the subset of the transmission nodes.

In another embodiment, selecting the desired combination of nodes includes identifying a subset of the node-specific pilot signals to be utilized by the wireless device based on the channel measurements, and selecting the desired combination of nodes from a subset of the transmission nodes corresponding to the subset of the node-specific pilot signals identified for utilization by the wireless device.

In one embodiment, the desired combination of nodes is a desired combination of two or more nodes, and the method further includes receiving downlink transmissions from the desired combination of two or more nodes using a distributed MIMO reception technique.

In one embodiment, the heterogeneous cellular communications network is a heterogeneous deployment of an evolved High Speed Packet Access (HSPA+) network. Further, in one embodiment, the node-specific pilot signals are Fractional Common Pilot Channel (F-CPICH) signals. In one embodiment, each F-CPICH signal is characterized by a combination of a spreading code and a scrambling code that is unique to a corresponding one of the transmission nodes within the combined cell.

In another embodiment, a wireless device that operates according to any one of the embodiments above is provided.

In yet another embodiment, a method of operation of a central control node of a combined cell in a heterogeneous cellular communications network is provided. In one embodiment, the method of operation of the central control node of the combined cell includes receiving, from a wireless device, channel measurements for multiple nodes in the combined cell. The channel measurements include, for each transmission node, a separate channel measurement for a channel between the transmission node and the wireless device. The method further includes selecting a subset of the transmission nodes to be utilized by the wireless device based on the channel measurements, and providing information that is indicative of the subset of the transmission nodes to the wireless device. The method further includes receiving, from the wireless device, a recommended combination of nodes for downlink transmission to the wireless device. The recommended combination of nodes is a combination of nodes from the subset of the transmission nodes in the combined cell identified by the information provided to the wireless device. The method further includes selecting one or more nodes for downlink transmission to the wireless device based on the recommended combination of nodes received from the wireless device, and causing downlink transmission to the wireless device from the one or more nodes selected for downlink transmission to the wireless device.

In one embodiment, a central control node of a combined cell in a heterogeneous cellular communications network that operates according to the method above is provided.

Those skilled in the art will appreciate the scope of the present disclosure and realize additional aspects thereof after reading the following detailed description of the embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Systems and methods related to providing spatial reuse gain as well as diversity and/or multiplexing gain in a combined cell of a heterogeneous cellular communications network are disclosed. In one embodiment, a wireless device within a combined cell of a heterogeneous cellular communications network is capable of simultaneously receiving from multiple nodes in the combined cell, and a two-stage search process is performed to select the best combination of nodes in the combined cell for downlink transmission to the wireless device. In the first stage, the wireless device recommends a combination of nodes for distributed Multiple-Input-Multiple-Output (MIMO) transmission to the wireless device. A central control node of the combined cell analyzes the recommended combination of nodes to decide a best combination of nodes for distributed MIMO transmission to the wireless device while at the same time allowing other nodes to operate in a spatial reuse transmission mode of operation. In this manner, spatial reuse gains as well as multiplexing and/or diversity gains can be achieved in the combined cell.

Figure 1:
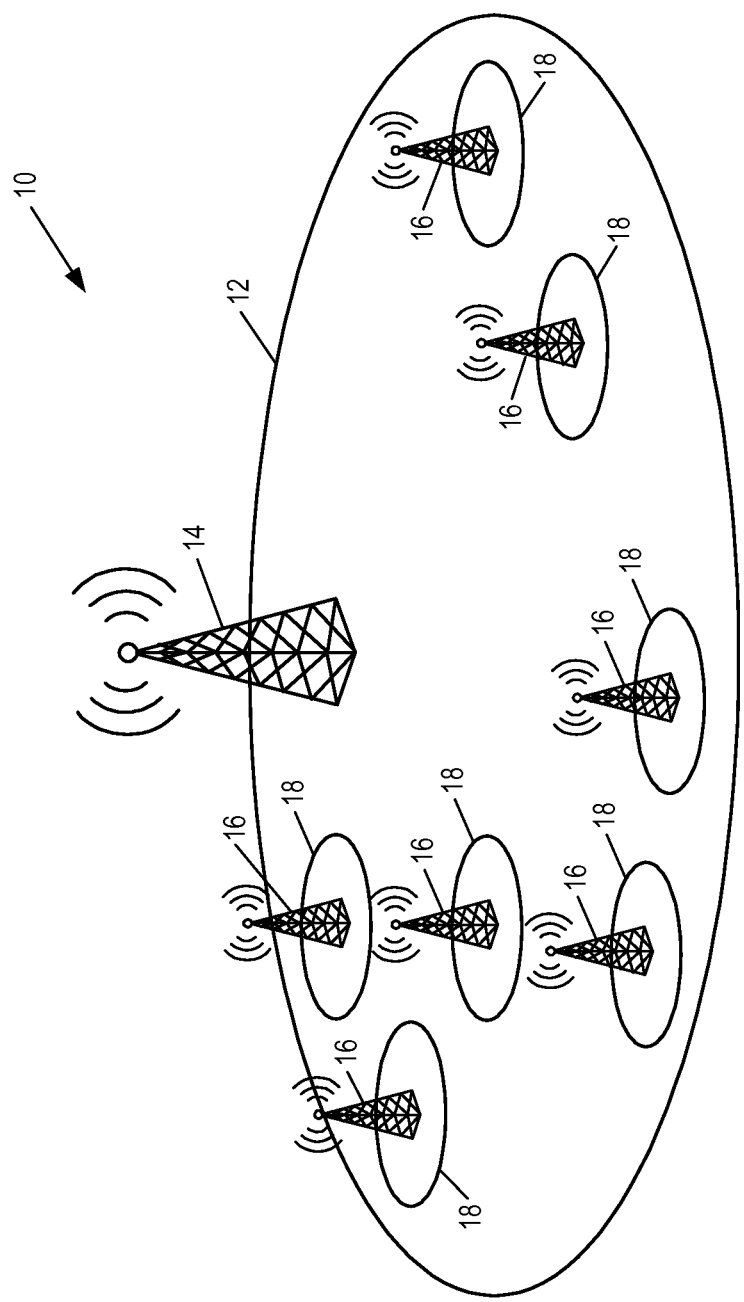
FIG. 1 illustrates a heterogeneous cellular communications network.
Figure 2:
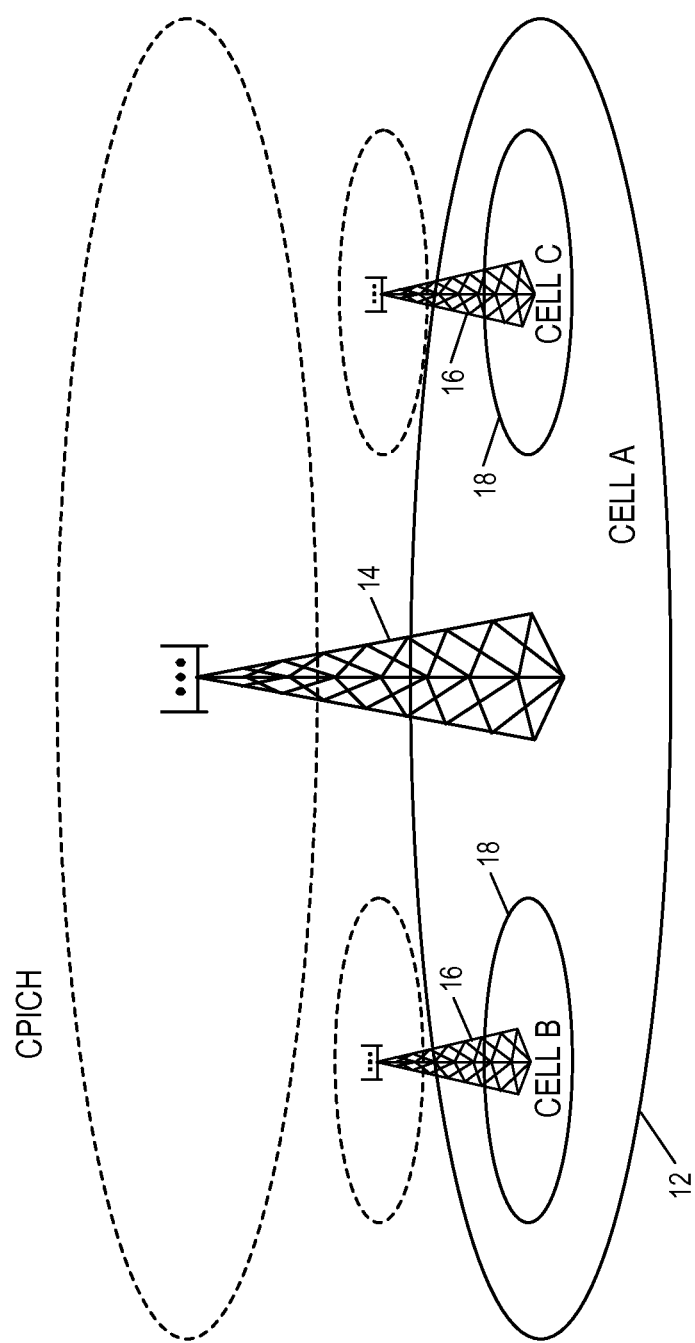
FIG. 2 illustrates a heterogeneous cellular communications network in which a macro cell and a number of small cells within the macro cell have the same cell Identifier (ID)
Figure 3:
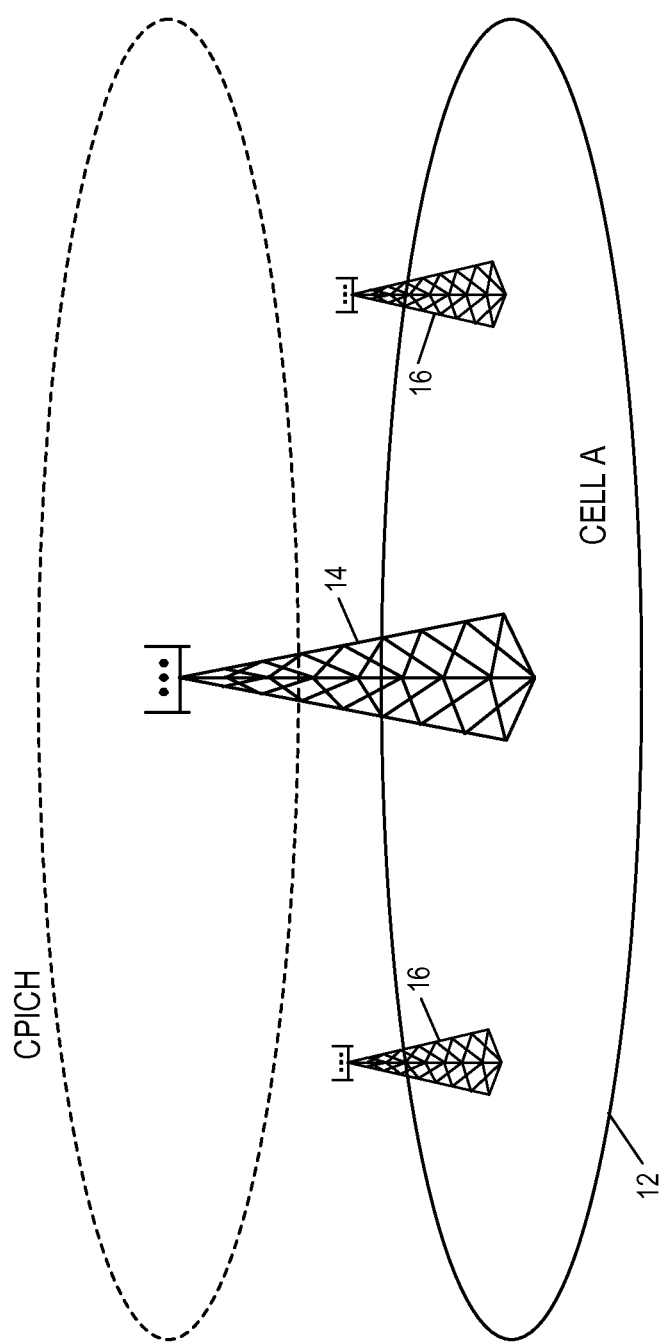
FIG. 3 illustrates a heterogeneous cellular communications network in which a macro cell and a number of small cells within the macro cell have the same cell ID such that, together, they form a combined cell.
Figure 4:
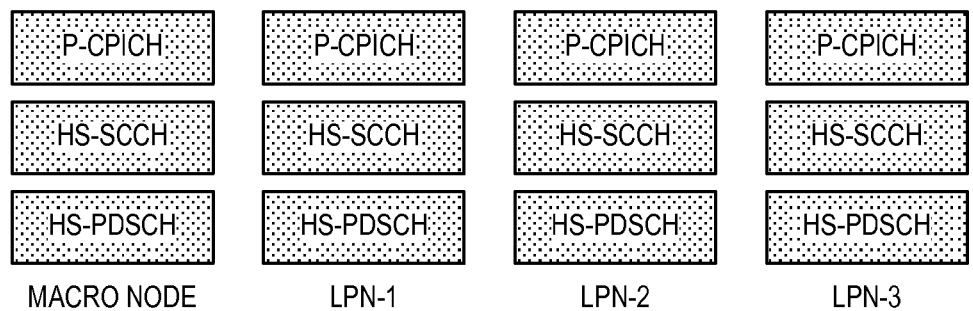
FIG. 4 is a graphical illustration of a Single Frequency Network (SFN) transmission mode for a combined cell.
Figure 5:
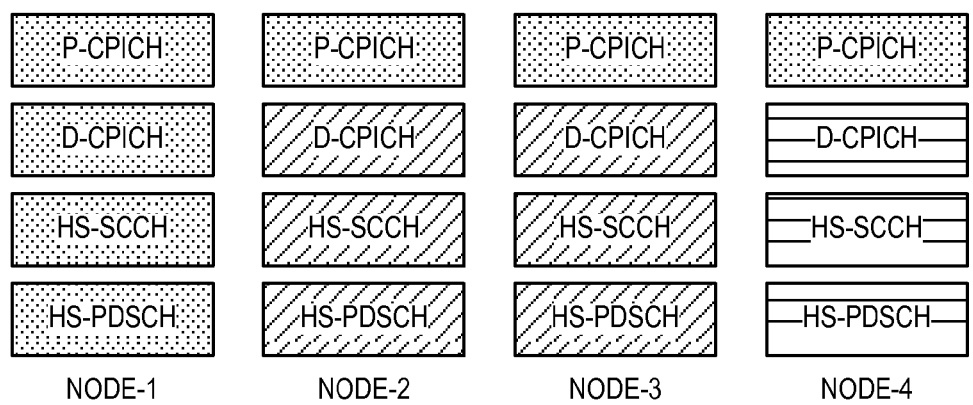
FIG. 5 is a graphical illustration of a spatial reuse transmission mode for a combined cell.
Figure 6:
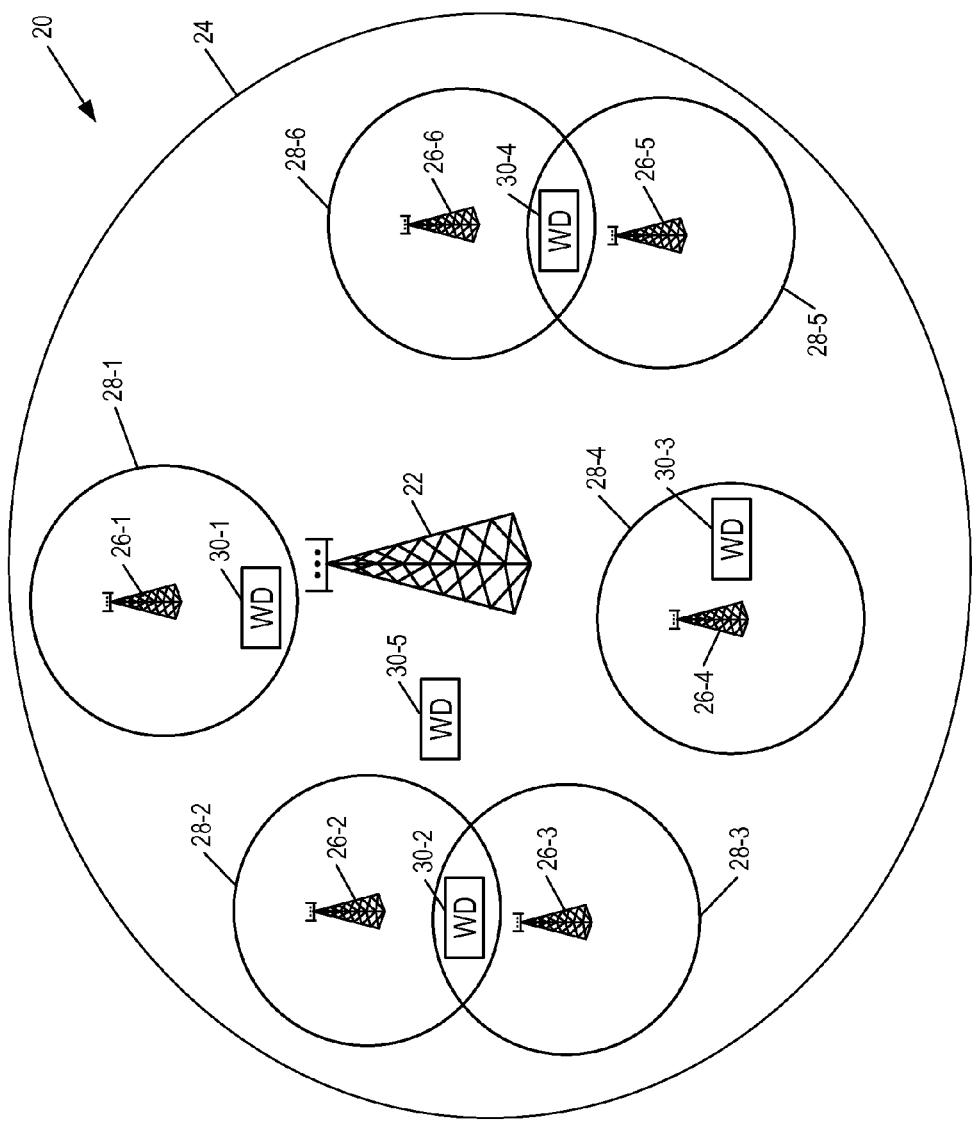
FIG. 6 illustrates a combined cell deployment of a heterogeneous cellular communications network that utilizes a two-stage search process to identify a best combination of transmission nodes for transmission to a wireless device in a combined cell according to one embodiment of the present disclosure.

In this regard, FIG. 6 illustrates a heterogeneous cellular communications network 20 according to one embodiment of the present disclosure. As illustrated, the heterogeneous cellular communications network 20 includes a macro, or high-power, node 22 (e.g., a macro base station) serving a macro cell 24 and a number of low-power nodes (LPNs) 26-1 through 26-6 (e.g., low-power base stations) serving corresponding small cells 28-1 through 28-6 (generally referred to herein collectively as small cells 28 and individually as small cell 28). The LPNs 26-1 through 26-N are generally referred to herein collectively as LPNs 26 and individually as a LPN 26. The macro node 22 and the LPNs 26 (or equivalently the macro cell 24 and the small cells 28) have the same layer 3 (L3) cell Identifier (ID) such that, together, the macro cell 24 and the small cells 28 form a combined cell. The macro node 22 and the LPNs 26 are also referred to herein as "transmission nodes" or "nodes" of the combined cell. Other terms that may be used for the transmission nodes of the combined cell include, e.g., "transmit antennas" or "transmit points" of the combined cell. Further, while in this example, the macro node 22 operates as a single transmission node serving the macro cell 24, the macro node 22 may operate as multiple transmission nodes serving multiple sectors of the macro cell 24.

As illustrated, a number of wireless devices 30-1 through 30-5 (generally referred to herein collectively as wireless devices 30 and individually as wireless device 30) are within the combined cell. The wireless devices 30 are sometimes referred to as User Equipment devices (UEs), user terminals, or the like. The wireless devices 30 may be any type(s) of device(s) that are capable of wireless communication with the heterogeneous cellular communications network 20 such as, for example, mobile phones, smart phones, tablet computers, etc.

At least some of the wireless devices 30 are capable of simultaneously receiving downlink transmissions from multiple (e.g., 2 or 4) transmission nodes in the combined cell. As discussed below in detail, for each wireless device 30 capable of simultaneous reception from multiple transmission nodes (or at least for some of those wireless devices 30), a two-stage process is utilized to select a best combination of transmission nodes to transmit to the wireless device 30 using a distributed MIMO scheme. In this manner, diversity and/or multiplexing gains can be achieved using distributed MIMO for the wireless devices 30 capable of simultaneous reception from multiple transmission nodes while at the same time spatial reuse gains can be achieved by re-using resources (e.g., channelization or spreading codes, scrambling codes, and/or frequency) for different wireless devices 30. For example, the LPNs 26-2 and 26-3 may simultaneously transmit to the wireless device 30-2 according to a distributed MIMO scheme to thereby provide diversity or multiplexing gain while at the same time the LPN 26-4 may transmit to the wireless device 30-3 using the same resources to thereby provide spatial re-use gain.

In some embodiments, the heterogeneous cellular communications network 20 is a Third Generation Partnership Project (3GPP) evolved High Speed Packet Access (HSPA+) network that utilizes Wideband Code Division Multiple Access (WCDMA) protocols. As such, in the description below, HSPA+/WCDMA terminology is sometimes used. However, the present disclosure is not limited to HSPA+/WCDMA. Rather, the embodiments disclosed herein may be used in any suitable type of heterogeneous cellular communications network such as, but not limited to, a Long Term Evolution (LTE) or LTE-Advanced network, a WiMAX network, a Fifth Generation (5G) cellular communications network, a WiFi network, a machine-to-machine network, or the like.

Figure 7A:
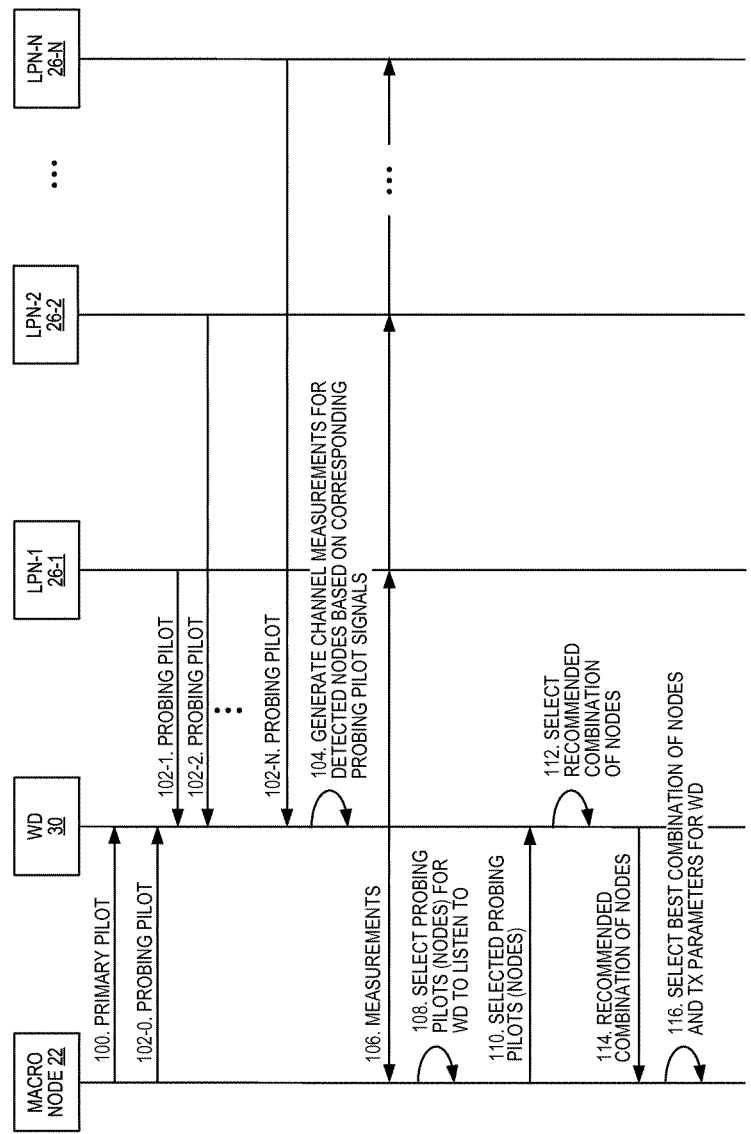
FIGS. 7A and 7B illustrate the operation of the network of FIG. 6 according to one embodiment of the present disclosure.
Figure 7B:
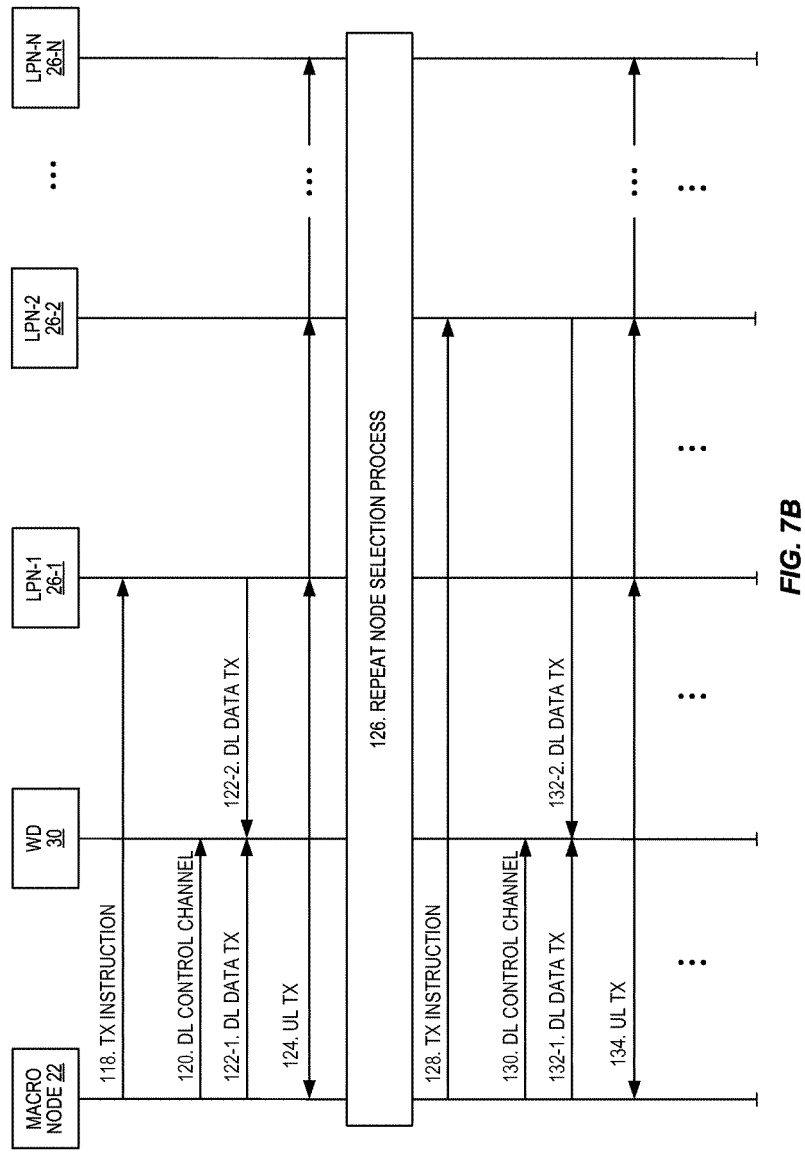

FIGS. 7A and 7B illustrate a two-stage process for selecting the best transmission nodes for one of the wireless devices 30 of FIG. 6 according to one embodiment of the present disclosure. As illustrated, the macro node 22 transmits a primary pilot, or reference, signal for the combined cell to the wireless device 30 (step 100). In addition, the macro node 22 and the LPNs 26-1 through 26-N transmit probing pilot, or reference, signals to the wireless device 30 (steps 102-0 through 102-N). The probing pilot signals are node-specific pilot signals. Thus, the probing pilot signal transmitted by the macro node 22 is different than the probing pilot signals transmitted by the LPNs 26-1 through 26-N, the probing pilot signal transmitted by the LPN 26-1 is different than probing pilot signal transmitted by the macro node 22 and different than the probing pilot signals transmitted by the other LPNs 26-2 through 26-N, the probing pilot signal transmitted by the LPN 26-2 is different than the probing pilot signal transmitted by the macro node 22 and different than the probing pilot signals transmitted by the other LPNs 26-1 and 26-3 through 26-N, etc. In one embodiment, the probing pilot signals are orthogonal to one another in frequency and/or time. For example, the probing pilot signals may be characterized by a different combination of channelization or spreading code and scrambling code where the channelization or spreading codes are selected from a set of orthogonal channelization or spreading codes and the scrambling codes are selected from a set of orthogonal spreading codes.

The wireless device 30 is able to detect the probing pilot signals of at least some of the transmission nodes in the combined cell. Using the wireless device 30-5 of FIG. 6 as an example, due to the physical location of the wireless device 30-5 and the transmit power levels of the transmission nodes, the wireless device 30-5 may detect the probing pilot signals of only, e.g., the macro node 22 and the LPNs 26-1, 26-2, and 26-3. In this case, the LPNs 26-1, 26-2, and 26-3 are referred to as detected LPNs 26-1, 26-2, and 26-3. Next, the wireless device 30 generates channel measurements for the detected transmission nodes (i.e., the transmission nodes that transmitted the probing pilot signals detected by the wireless device 30) based on the corresponding probing pilot signals (step 104). While any suitable channel measurement may be used (e.g., Channel Quality Indication (CQI), Received Signal Strength Indicator (RSSI), Reference Signal Received Power (RSRP), Reference Signal Received Quality (RSRQ), etc.), in one embodiment, the channel measurements are CQI measurements. By using the different probing pilot signals of the detected transmission nodes, the wireless device 30 is able to generate a separate channel measurement for each of the detected transmission nodes. For instance, the wireless device 30 generates a channel measurement for the macro node 22 using the probing pilot signal transmitted by the macro node 22, a channel measurement for the LPN 26-1 using the probing pilot signal transmitted by the LPN 26-1, a channel measurement for the LPN 26-2 using the probing pilot signal transmitted by the LPN 26-2, etc.

The wireless device 30 then transmits the channel measurements to the combined cell (step 106). The channel measurements may be time multiplexed or transmitted all at the same time (e.g., in the same subframe). The transmission of the channel measurements also includes information that identifies the corresponding LPNs 26. The transmission of the channel measurements is received by the macro node 22 and all of the LPNs 26 that are in sufficient proximity to the wireless device 30. A central control node, which in this example is or is part of the macro node 22, selects a subset of the probing pilot signals (or equivalently a subset of the transmission nodes in the combined cell) to be listened to, or utilized, by the wireless device 30 based on the channel measurements (step 108). More specifically, in one embodiment, the probing pilot signals or transmission nodes having channel measurements that are better than a predefined threshold are selected as the subset to be utilized by the wireless device 30. In another embodiment, the central control node selects a predefined number of best transmission nodes (i.e., a predefined number (e.g., 2, 4, or 8) of transmission nodes having the best channel measurements). Here, the term "subset" refers to an inclusive subset (as opposed to a proper subset) such that the subset of the probing pilot signals to be utilized by the wireless device 30 is any one or more and potentially all probing pilot signals of the transmission nodes in the combined cell.

The central control node then instructs, or causes, the macro node 22 (and in some embodiments all of the LPNs 26) to transmit information to the wireless device 30 that identifies the subset of the probing pilot signals (or transmission nodes) to be utilized by the wireless device 30 (step 110). The wireless device 30 then selects a recommended combination of transmission nodes for the wireless device 30 from the subset of the transmission nodes identified in the information received in step 110 (step 112). In one embodiment, the recommended combination is the combination of transmission nodes from the subset that provides good or, preferably, the best distributed MIMO operation for the wireless device 30 (e.g., the subset that provides the highest distributed MIMO channel capacity or highest spectral efficiency). More specifically, in one embodiment, the wireless device 30 is capable of simultaneously receiving from M transmission nodes in the combined cell. The wireless device 30 determines all possible combinations of M transmission nodes from the subset of transmission nodes selected for utilization by the wireless device 30. The number of combinations can be expressed by the choose M function. Specifically, if the number of transmission nodes in the subset selected for the wireless device 30 is $N_{SEL}$, then the number of combinations of M transmission nodes from the subset can be expressed as:

$C(N_{SEL}, M)$, where C is the combination function. In addition, in some embodiments, the wireless device 30 determines all possible combinations of 1 transmission node from the subset of transmission nodes selected for utilization by the wireless device 30. The wireless device 30 computes a channel capacity for each determined combination and selects the combination having the highest MIMO channel capacity as the recommended combination of transmission nodes for the wireless device 30. Note that while only combinations of M and combinations of 1 are used in the example above, the wireless device 30 may also consider combinations of other sizes. For example, if M=4, then the wireless device 30 may consider combinations of four transmission nodes, combinations of 2 transmission nodes, and combinations of 1 transmission node.

The wireless device 30 then transmits the recommended combination of transmission nodes to the macro node 22 (step 114). In addition to the recommended combination, the wireless device 30 may also convey values for one or more additional parameters such as, for example, rank information (e.g., number of transport blocks preferred), channel measurement value (e.g., CQI value) corresponding to the recommended combination, and/or precoding control index for the recommended combination. The central control node, which again in this example is or is part of the macro node 22, then selects a best combination of transmission nodes and, in some embodiments, one or more transmission parameters for the wireless device 30 based on the recommended combination of transmission nodes received from the wireless device 30 (step 116). In one embodiment, the best combination of transmission nodes for the wireless device 30 is the combination of transmission nodes recommended by the wireless device 30. However, in other embodiments, the central control node may take other factors (e.g., node selections for other wireless devices 30) into consideration, where these other factors may cause the central control node to select a combination of transmission nodes for the wireless device 30 that is different than the recommended combination of transmission nodes. In addition to the best combination of transmission nodes, the central control node may select values for transmission parameters such as, for example, a number of codes, a precoding control index, a number of transport blocks, modulation type, transport block sizes, Hybrid Automatic Repeat Request (HARQ) information, or the like, or any combination thereof. Again, for these transmission parameters, the central control node may use values recommended by the wireless device 30 or values selected by the central control node (e.g., randomly or based on other factors).

In this example, the macro node 22 and the LPN 26-1 are selected as the best combination of transmission nodes for distributed MIMO transmission to the wireless device 30. As such, the central control node instructs the transmission nodes in the combination to transmit to the wireless device 30 (step 118). Note that, in this example, the instruction to the macro node 22 is internal to the macro node 22. A downlink control channel for the wireless device 30 can be transmitted by any one of the transmission nodes in the combination. However, in this example, the downlink control channel is transmitted by the macro node 22 (step 120). The macro node 22 and the LPN 26-1 then simultaneously transmit downlink data to the wireless device 30, and the wireless device 30 simultaneously receives the downlink data transmitted from the macro node 22 and the LPN 26-1 using a distributed MIMO scheme (steps 122-1 and 122-2).

When appropriate, the wireless device 30 transmits an uplink to the combined cell (step 124), where the uplink is received by all nodes in the combined cell that are sufficiently near the wireless device 30. This process continues until, e.g., the wireless device 30 receives an order via, e.g., downlink signal or Radio Resource Control (RRC) reconfiguration to repeat the selection process.

At this point, the wireless device 30 repeats the two-stage selection process described above (step 126). In this example, the two-stage selection process selects the macro node 22 and the LPN 26-2 as the best combination for the wireless device 30. As such, the central control node instructs the transmission nodes in the combination to transmit to the wireless device 30 (step 128). Note that, in this example, the instruction to the macro node 22 is internal to the macro node 22. A downlink control channel for the wireless device 30 can be transmitted by any one of the transmission nodes in the combination. However, in this example, the downlink control channel is transmitted by the macro node 22 (step 130). The macro node 22 and the LPN 26-2 then simultaneously transmit downlink data to the wireless device 30, and the wireless device 30 simultaneously receives the downlink data transmitted from the macro node 22 and the LPN 26-2 using a distributed MIMO scheme (steps 132-1 and 132-2). When appropriate, the wireless device 30 transmits an uplink to the combined cell (step 134), where the uplink is received by all nodes in the combined cell that are sufficiently near the wireless device 30. The process then continues.

Figure 8A:
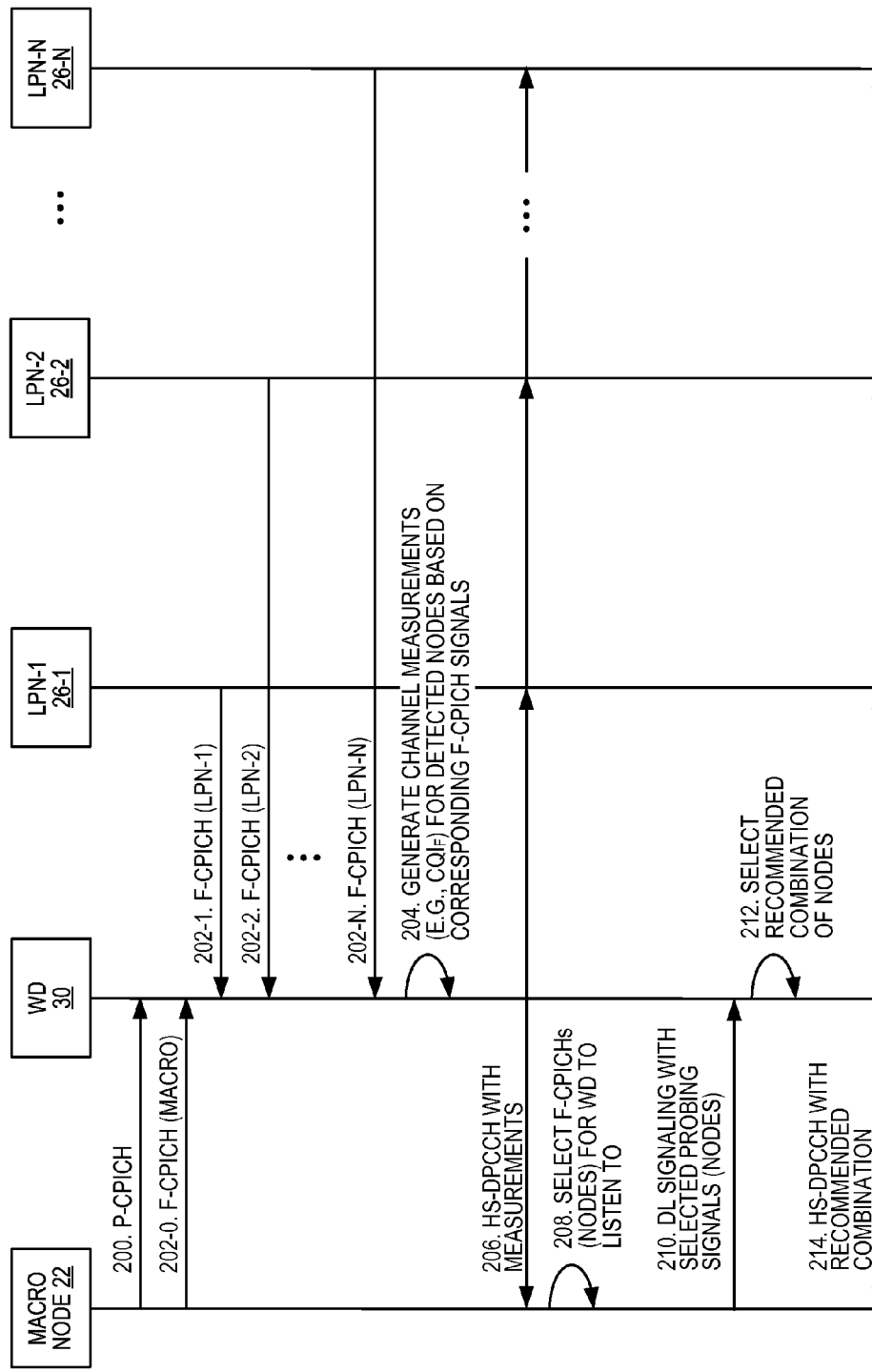
FIGS. 8A and 8B illustrate the operation of the network of FIG. 6 according to another embodiment of the present disclosure.
Figure 8B:
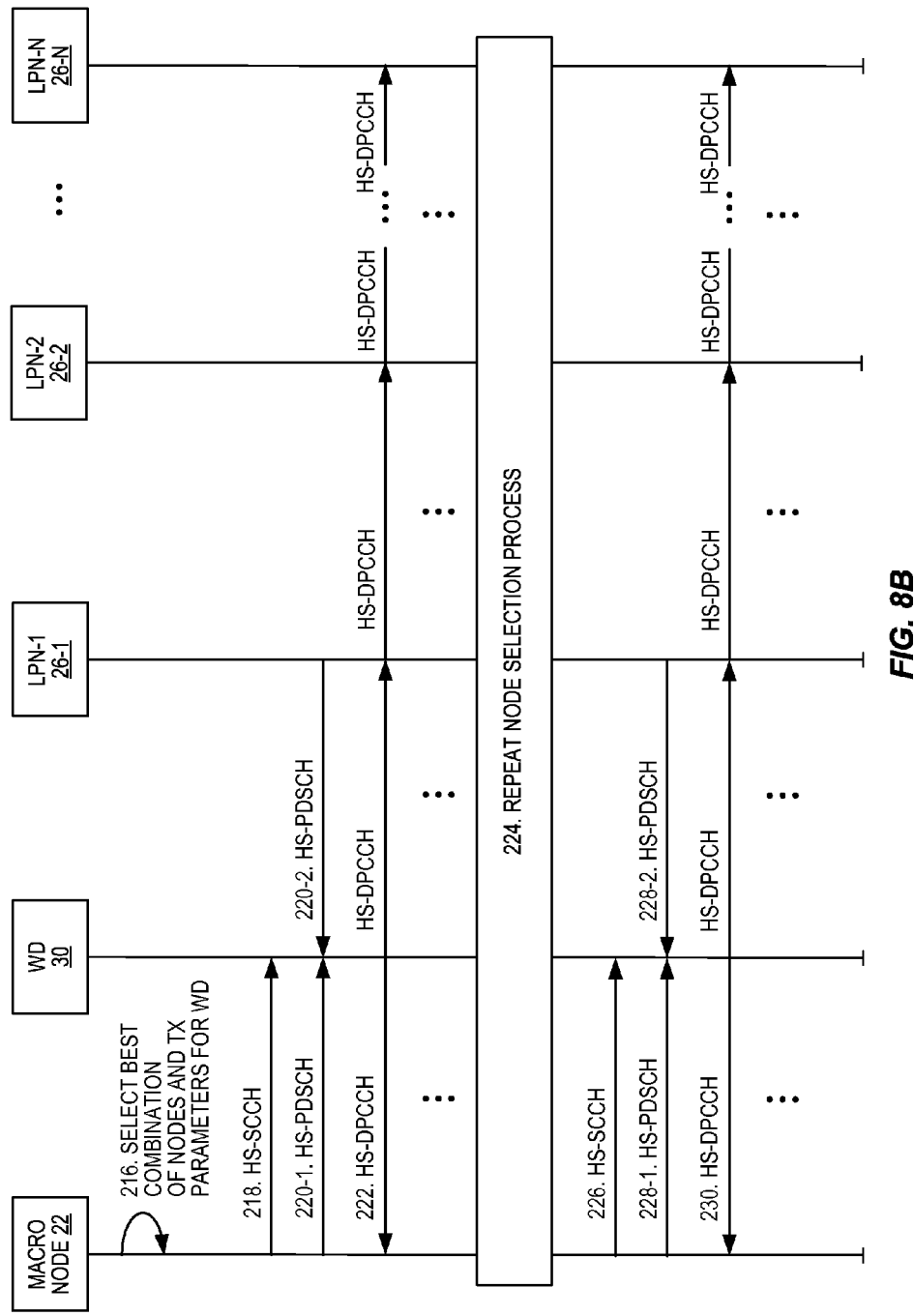

FIGS. 8A and 8B illustrate a process similar to that of FIGS. 7A and 7B, but where the heterogeneous cellular communications network 20 is a High Speed Packet Access (HSPA)/WCDMA network according to one embodiment of the present disclosure. As illustrated, the macro node 22 transmits a Primary Common Pilot Channel (P-CPICH) signal to the wireless device 30 that is specific to the combined cell (step 200). In addition, the macro node 22 and the LPNs 26-1 through 26-N transmit Fractional Common Pilot Channel (F-CPICH) signals to the wireless device 30 (steps 202-0 through 202-N). The F-CPICH signals are node-specific probing pilot signals that can be, in some embodiments, similar to the P-CPICH. The F-CPICH signals are orthogonal to one another in frequency and/or time. In one particular embodiment, each F-CPICH signal is characterized by combination of a spreading code and a scrambling code that is specific to the corresponding transmission node in the combined cell. Further, the F-CPICH has, in some embodiments, a fixed rate (e.g., Spreading Factor (SF)=256). Note that the F-CPICH channel power levels may be indicated to the wireless device 30 during initial call set up.

The wireless device 30 is able to detect the F-CPICH signals of at least some of the transmission nodes in the combined cell. Next, the wireless device 30 generates channel measurements for the detected transmission nodes (i.e., the transmission nodes that transmitted the F-CPICH signals detected by the wireless device 30) based on the corresponding F-CPICH signals (step 204). While any suitable channel measurement may be used (e.g., CQI, RSSI, RSRP, RSRQ, etc.), in one embodiment, the channel measurements are CQI measurements. Each channel measurement corresponds to a specific transmission node/F-CPICH signal. The wireless device 30 then transmits the channel measurements to the combined cell on a High Speed Dedicated Physical Control Channel (HS-DPCCH) (step 206). Note that the wireless device 30 may transmit the channel measurements for only the detected transmission nodes or may transmit the channel measurements for detected transmission nodes and channel measurements for un-detected transmission nodes (which may be set to some default value). The channel measurements may be time multiplexed or transmitted all at the same time (e.g., in the same subframe). The transmission of the channel measurements also includes information that identifies the corresponding LPNs 26 (or equivalently the corresponding F-CPICH signals).

The transmission of the channel measurements is received by the macro node 22 and all of the LPNs 26 that are in sufficient proximity to the wireless device 30. A central control node, which in this example is or is part of the macro node 22, selects a subset of the F-CP ICH signals (or equivalently a subset of the transmission nodes in the combined cell) to be listened to, or utilized, by the wireless device 30 based on the channel measurements (step 208). In general, the macro node 22 utilizes the channel measurements to select, or identify, the subset of the transmission nodes that are close to the wireless device 30 (e.g., vicinity detection). More specifically, in one embodiment, the F-CPICH signals or transmission nodes having channel measurements that are better than a predefined threshold are selected as the subset to be utilized by the wireless device 30. In another embodiment, the central control node selects a predefined number of best transmission nodes (i.e., a predefined number (e.g., 2, 4, or 8) of transmission nodes having the best channel measurements).

The central control node then instructs, or causes, the macro node 22 (and in some embodiments all LPNs 26) to transmit a downlink signal to the wireless device 30 including information identifying the subset of the F-CPICH signals (or transmission nodes) to be utilized by the wireless device 30 (step 210). Again, the subset of the transmission nodes to be used by the wireless device 30 are those transmission nodes that are sufficiently close to the wireless device 30 as determined by the central control node based on the corresponding channel measurements. The downlink signal may be, for example, a High Speed Shared Control Channel (HS-SCCH) order to a separate downlink channel. Further, in one embodiment, the information is conveyed via a binary representation. It should also be noted that, in another embodiment, the central control node conveys the information identifying the subset of the F-CPICH signals (or transmission nodes) to be utilized by the wireless device 30 to a Radio Network Controller (RNC), and then the RNC sends this information via RRC reconfiguration.

Once the wireless device 30 receives the information identifying the F-CPICH signals (or transmission nodes) to be utilized, or listened to, by the wireless device 30, the wireless device 30 selects a recommended combination of transmission nodes for the wireless device 30 (step 212). In one embodiment, the recommended combination is the combination of transmission nodes from the subset that provides good or, preferably, the best distributed MIMO operation for the wireless device 30 (e.g., provide the highest distributed MIMO channel capacity or highest spectral efficiency). More specifically, in one embodiment, the wireless device 30 is capable of simultaneously receiving from M transmission nodes in the combined cell. The wireless device 30 determines all possible combinations of M transmission nodes from the subset of transmission nodes selected for utilization by the wireless device 30. In addition, in some embodiments, the wireless device 30 determines all possible combinations of 1 transmission node from the subset of transmission nodes selected for utilization by the wireless device 30. The wireless device 30 computes a channel capacity for each determined combination and selects the combination having the highest MIMO channel capacity as the recommended combination of transmission nodes for the wireless device 30. Note that while only combinations of M and combinations of 1 are used in the example above, the wireless device 30 may also consider combinations of other sizes. For example, if M=4, then the wireless device 30 may consider combinations of four transmission nodes, combinations of 2 transmission nodes, and combinations of 1 transmission node.

The wireless device 30 then transmits the recommended combination of transmission nodes to the combined cell via HS-DPCCH (step 214). In addition to the recommended combination, the wireless device 30 may also convey values for one or more additional parameters such as, for example, rank information (e.g., number of transport blocks preferred), channel measurement value (e.g., CQI value) corresponding to the recommended combination, and/or precoding control index for the recommended combination. The central control node, which again in this example is or is part of the macro node 22, then selects a best combination of transmission nodes and, in some embodiments, one or more transmission parameters for the wireless device 30 based on the recommended combination of transmission nodes received from the wireless device 30 (step 216). In one embodiment, the best combination of transmission nodes for the wireless device 30 is the combination of transmission nodes recommended by the wireless device 30. However, in other embodiments, the central control node may take other factors (e.g., node selections for other wireless devices 30) into consideration, which may cause the central control node to select a combination of transmission nodes for the wireless device 30 that is different than the recommended combination of transmission nodes. In addition to the best combination of transmission nodes, the central control node may select values for transmission parameters such as, for example, a number of codes, a precoding control index, a number of transport blocks, modulation type, transport block sizes, HARQ information, or the like, or any combination thereof. Again, for these transmission parameters, the central control node may use values recommended by the wireless device 30 or values selected by the central control node randomly or based on other factors.

In this example, the macro node 22 and the LPN 26-1 are selected as the best combination of transmission nodes for distributed MIMO transmission to the wireless device 30. As such, the central control node instructs the transmission nodes in the combination to transmit to the wireless device 30. Note that, in this example, the instruction to the macro node 22 is internal to the macro node 22. A downlink control channel for the wireless device 30 can be transmitted by any one of the transmission nodes in the combination. However, in this example, the downlink control channel (i.e., a HS-SCCH) is transmitted by the macro node 22 (step 218). The macro node 22 and the LPN 26-1 then simultaneously transmit downlink data to the wireless device 30 via High Speed Physical Downlink Shared Channel (HS-PDSCH), and the wireless device 30 simultaneously receives the downlink data transmitted from the macro node 22 and the LPN 26-1, using a distributed MIMO scheme (steps 220-1 and 220-2). When appropriate, the wireless device 30 transmits an uplink to the combined cell via HS-DPCCH (step 222), where the uplink is received by all nodes in the combined cell that are sufficiently near the wireless device 30. This process continues until, e.g., the wireless device 30 receives an order via either downlink signal or RRC reconfiguration to repeat the selection process.

At this point, the wireless device 30 repeats the two-stage selection process described above (step 224). In this example, the two-stage selection process selects the macro node 22 and the LPN 26-1 as the best combination of transmission nodes for distributed MIMO transmission to the wireless device 30. As such, the central control node instructs the transmission nodes in the combination to transmit to the wireless device 30. Note that, in this example, the instruction to the macro node 22 is internal to the macro node 22. A downlink control channel for the wireless device 30 can be transmitted by any one of the transmission nodes in the combination. However, in this example, the downlink control channel (i.e., a HS-SCCH) is transmitted by the macro node 22 (step 226). The macro node 22 and the LPN 26-1 then simultaneously transmit downlink data to the wireless device 30 via HS-PDSCH, and the wireless device 30 simultaneously receives the downlink data transmitted from the macro node 22 and the LPN 26-1, using a distributed MIMO scheme (steps 228-1 and 228-2). When appropriate, the wireless device 30 transmits an uplink to the combined cell via HS-DPCCH (step 230), where the uplink is received by all nodes in the combined cell that are sufficiently near the wireless device 30. The process then continues.

Figure 9:
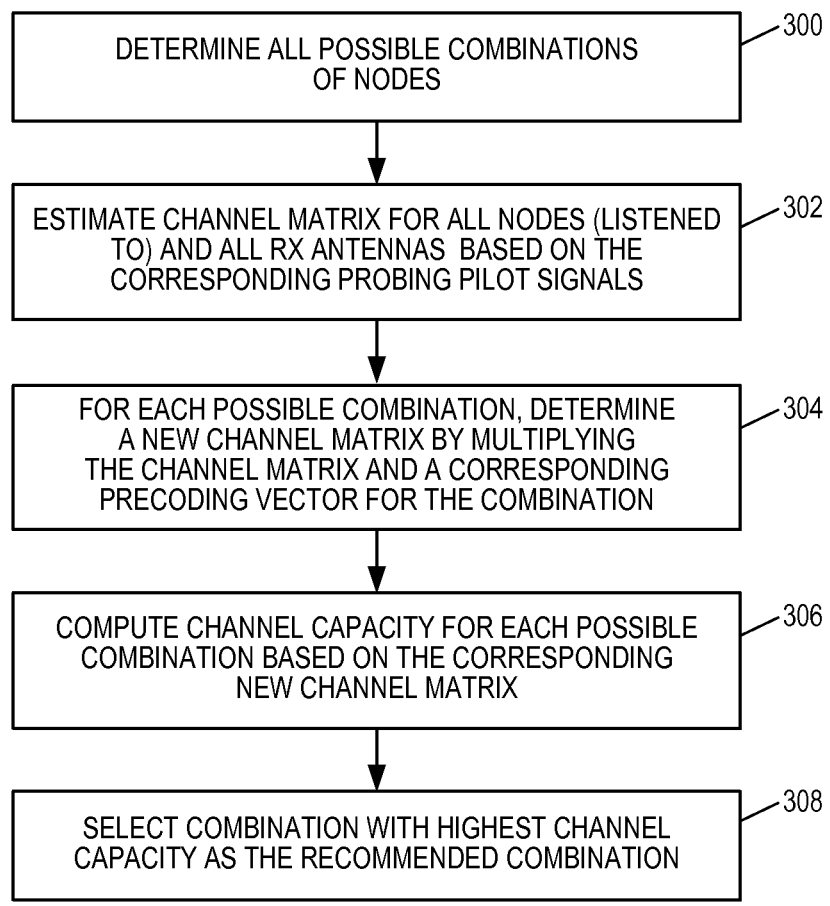
FIG. 9 is a flow chart that illustrates a process for selecting a combination of transmission nodes that provide a highest channel capacity for a wireless device according to one embodiment of the present disclosure.

FIG. 9 illustrates a process by which the wireless device 30 of FIGS. 7A and 7B or FIGS. 8A and 8B selects the recommended combination of transmission nodes according to one embodiment of the present disclosure. As illustrated, the wireless device 30 first determines all possible combinations of nodes (step 300). In one embodiment, the wireless device 30 is capable of simultaneously receiving from M transmission nodes, and the possible combinations are all possible combinations of M transmission nodes from the subset of the transmission nodes in the combined cell that were selected by the central control node for utilization by the wireless device 30. Thus, if the subset of transmission nodes includes $N_{SEL}$ transmission nodes, then the number of possible combinations is defined by $C(N_{SEL},M)$. In another embodiment, the wireless device 30 is capable of simultaneously receiving from M transmission nodes, and the possible combinations are all possible combinations of M transmission nodes plus all possible combinations of 1 transmission node from the subset of the transmission nodes in the combined cell that were selected by the central control node for utilization by the wireless device 30. Thus, if the subset of transmission nodes includes $N_{SEL}$ transmission nodes, then the number of possible combinations is defined by $C(N_{SEL},M)+N_{SEL}$.

The wireless device 30 also estimates a channel matrix (H) for an aggregate channel between the wireless device 30 and the subset of the transmission nodes selected for utilization by the wireless device 30 (step 302). Then, for each of the possible combinations determined in step 300, the wireless device 30 determines (e.g., computes) a new channel matrix ($H_{NEW,k}$) for the combination by multiplying the channel matrix (H) and a corresponding probing precoding vector ($P_k$) for the combination (step 304). Thus, assuming that the number of possible combinations is $N_{COMB}$, then for each value of k in the range of 1 to $N_{COMB}$, the new channel matrix ($H_{NEW,k}$) for the k-th combination is defined as:

$$H_{NEW,k}=H \times P_k$$

where $P_k$ is a vector containing $N_{SEL}$ elements each corresponding to a different one of the $N_{SEL}$ transmission nodes in the subset of the transmission nodes in the combined cell selected for utilization by the wireless device 30. For the k-th combination, each element of the probing precoding vector ($P_k$) is equal to "1" if the corresponding transmission node in the subset is included in the combination and "0" if the corresponding transmission node in the subset is not included in the combination. As an example, if $N_{SEL}=4$ and M=2, then the precoding vectors are: $P_1=[1;1;0;0]$, $P_2=[1;0;1;0]$, $P_3=[1;0;0;1]$, $P4=[0;1;1;0]$, $P_5=[0;1;0;1]$; and $P_6=[0;0;1;1]$. Further, if the combinations include combinations of 1, the precoding vectors further include: $P_7=[1;0;0;0]$, $P_8=[0;1;0;0]$, $P_9=[0;0;1;0]$, and $P_{10}=[0;0;0;1]$.

Next, the wireless device 30 computes or otherwise determines a channel capacity for each possible combination based on the corresponding new channel matrix for that combination determined in step 304 (step 306). More specifically, in one embodiment, for each value of k in the range of 1 to $N_{COMB}$, the channel capacity of the k-th combination is defined as:

$$C_k=\log_2(\text{Det}(I+H_{NEW,k}*H_{NEW,k}^H))$$

where Det( ) denotes the determinant, I is the identity matrix, superscript H denotes the Hermitian transpose, and "*" denotes matrix convolution. The wireless device 30 then selects the combination with the highest channel capacity ($C_k$) as the recommended combination (step 308).

Figure 10:
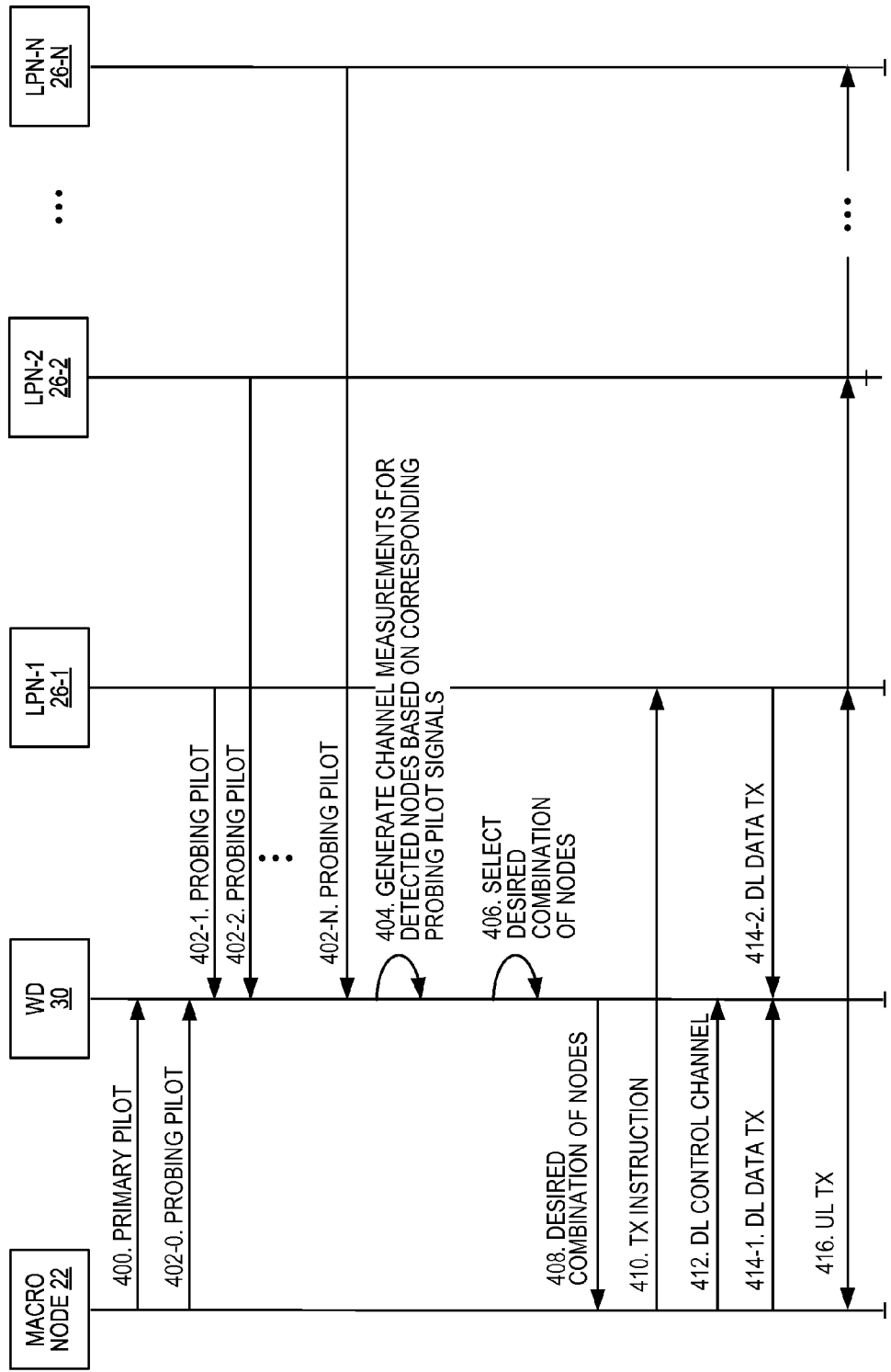
FIG. 10 illustrates the operation of the network of FIG. 6 according to another embodiment of the present disclosure.

FIG. 10 illustrates the operation of the heterogeneous cellular communications network 20 of FIG. 6 according to another embodiment of the present disclosure. This embodiment is similar to those described above but where the selection of the desired or best combination of transmission nodes for the wireless device 30 is performed by the wireless device 30 rather than the central control node of the combined cell. As illustrated, in this embodiment, the macro node 22 transmits a primary pilot, or reference, signal for the combined cell to the wireless device 30 (step 400). In addition, the macro node 22 and the LPNs 26-1 through 26-N transmit probing pilot, or reference, signals, to the wireless device 30 as discussed above (steps 402-0 through 402-N).

The wireless device 30 is able to detect the probing pilot signals of at least some of the transmission nodes in the combined cell. Next, the wireless device 30 generates channel measurements for the detected transmission nodes (i.e., the transmission nodes that transmitted the probing pilot signals detected by the wireless device 30) based on the corresponding probing pilot signals (step 404). While any suitable channel measurement may be used (e.g., CQI, RSSI, RSRP, RSRQ, etc.), in one embodiment, the channel measurements are CQI measurements.

In this embodiment, rather than sending the channel measurements to the combined cell, the wireless device 30 then utilizes the channel measurements to select a desired or best combination of transmission nodes for downlink transmission to the wireless device 30 (step 406). More specifically, in one embodiment, the wireless device 30 first selects a subset of the detected node-specific pilot signals to be utilized by the wireless device 30 in the same manner as described above with respect to the central control node in the embodiments of FIGS. 7A and 7B and FIGS. 8A and 8B. Then, the wireless device 30 selects a desired or best combination of transmission nodes from the subset, as described above.

The wireless device 30 then sends information indicative of the desired combination of transmission nodes to the macro node 22 (step 408). In this example, the macro node 22 and the LPN 26-1 are selected as the best combination of transmission nodes for distributed MIMO transmission to the wireless device 30. As such, the central control node instructs the transmission nodes in the combination to transmit to the wireless device 30 (step 410). Note that, in this example, the instruction to the macro node 22 is internal to the macro node 22. A downlink control channel for the wireless device 30 can be transmitted by any one of the transmission nodes in the combination. However, in this example, the downlink control channel is transmitted by the macro node 22 (step 412). The macro node 22 and the LPN 26-1 then simultaneously transmit downlink data to the wireless device 30, and the wireless device 30 simultaneously receives the downlink data transmitted from the macro node 22 and the LPN 26-1 using a distributed MIMO scheme (steps 414-1 and 414-2). When appropriate, the wireless device 30 transmits an uplink to the combined cell (step 416), where the uplink is received by all nodes in the combined cell that are sufficiently near the wireless device 30. This process may then continue, where a new combination of transmission nodes for the wireless device 30 may be selected as needed or desired.

Note that while the wireless device 30 selects the desired or best combination in the embodiment of FIG. 10, the process of FIG. 10 may be modified such that the central control node of the combined cell may further analyze the desired or best combination selected by the wireless device 30 based on other factors (e.g., node selections for other wireless devices 30). These other factors may, in some cases, cause the central control node to select a new or final combination of transmission nodes for the wireless device 30 that is different than that selected by the wireless device 30.

Figure 11:
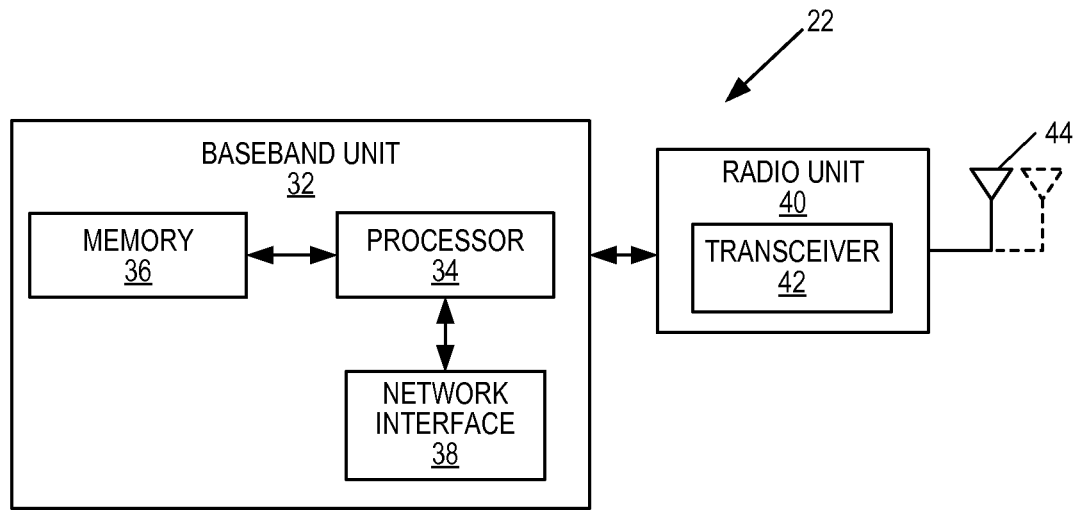
FIG. 11 is a block diagram of the macro base station of FIG. 6 according to one embodiment of the present disclosure.

While the macro node 22 may be implemented in hardware or any combination of hardware and/or software, FIG. 11 is a block diagram of one of the macro nodes 22 according to one embodiment of the present disclosure. As illustrated, the macro node 22 includes a baseband unit 32 including a processor 34, memory 36, and a network interface 38 and a radio unit 40 including a transceiver 42 coupled to one or more antennas 44. In one embodiment, the functionality of the macro node 22 described herein is implemented in software stored in the memory 36 and executed by the processor 34. Additionally, the macro node 22 may include additional components responsible for providing additional functionality, including any of the functionality described above and/or any functionality necessary to support the embodiments described herein.

Figure 12:
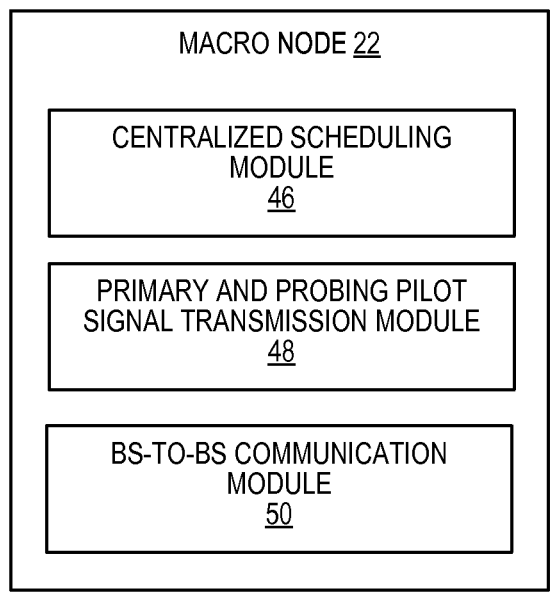
FIG. 12 is a block diagram of the macro base station of FIG. 6 according to another embodiment of the present disclosure.

FIG. 12 is a functional block diagram of the macro node 22 according to one embodiment of the present disclosure. As illustrated, the macro node 22 includes a centralized scheduling module 46, a primary and probing pilot signal transmission module 48, and a base-station-to-base-station communication module 50, each of which is implemented in software executed by one or more processors (e.g., the processor 34 of FIG. 11). The centralized scheduling module 46 operates to, in some embodiments, receive channel measurements from a wireless device 30, select probing pilot signals (or transmission nodes) in the combined cell to be utilized by the wireless device 30, and receive and process a recommended combination of transmission nodes from the wireless device 30 to thereby select a best combination of transmission nodes for the wireless device 30. The primary and probing pilot signal transmission module 48 operates to transmit, or cause transmission of, the primary and probing pilot signals by the macro node 22. The base-station-to-base-station communication module 50 operates to provide, e.g., backhaul communication with the LPNs 26 and/or other macro nodes 22.

Figure 13:
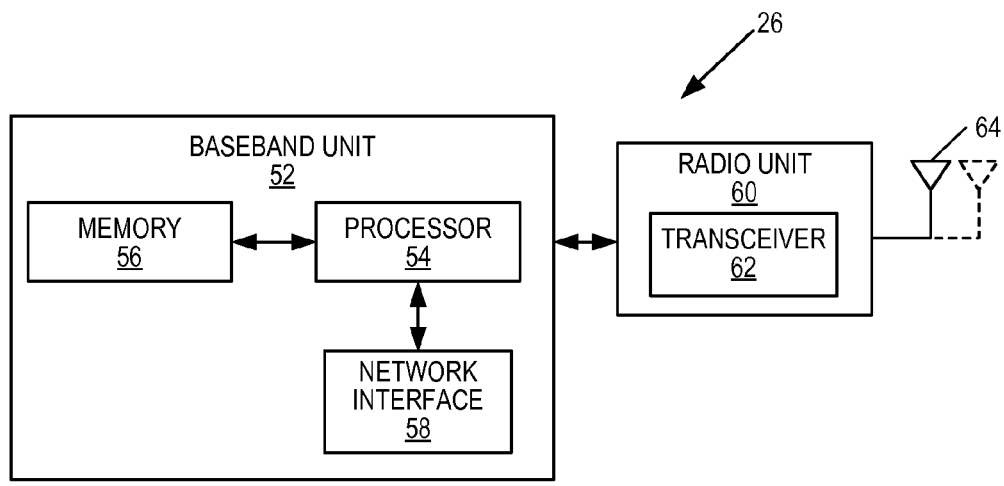
FIG. 13 is a block diagram of one of the low-power base stations of FIG. 6 according to one embodiment of the present disclosure.

While the LPNs 26 may be implemented in hardware or any combination of hardware and/or software, FIG. 13 is a block diagram of one of the LPNs 26 according to one embodiment of the present disclosure. As illustrated, the LPN 26 includes a baseband unit 52 including a processor 54, memory 56, and a network interface 58 and a radio unit 60 including a transceiver 62 coupled to one or more antennas 64. In one embodiment, the functionality of the LPN 26 described herein is implemented in software stored in the memory 56 and executed by the processor 54. Additionally, the LPN 26 may include additional components responsible for providing additional functionality, including any of the functionality described above and/or any functionality necessary to support the embodiments described herein.

In one embodiment, a computer program including instructions which, when executed by at least one processor, cause the at least one processor to carry out the functionality of a radio access node (e.g., the macro node 22 or the LPN 26) according to any one of the embodiments described herein is provided. In one embodiment, a carrier containing the aforementioned computer program product is provided. The carrier is one of an electronic signal, an optical signal, a radio signal, or a computer-readable storage medium (e.g., a non-transitory computer-readable medium such as the memory 36, 56).

Figure 14:
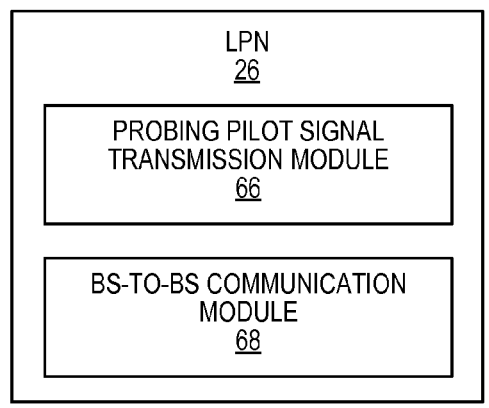
FIG. 14 is a block diagram of one of the low-power base stations of FIG. 6 according to another embodiment of the present disclosure.

FIG. 14 is a functional block diagram of one of the LPNs 26 according to one embodiment of the present disclosure. As illustrated, the LPN 26 includes a probing pilot signal transmission module 66 and a base-station-to-base-station communication module 68, each of which is implemented in software executed by one or more processors (e.g., the processor 54 of FIG. 13). The probing pilot signal transmission module 66 operates to transmit or cause the LPN 26 to transmit the probing pilot signal. The base-station-to-base-station communication module 68 operates to, e.g., enable backhaul communication with the macro node 22.

Figure 15:
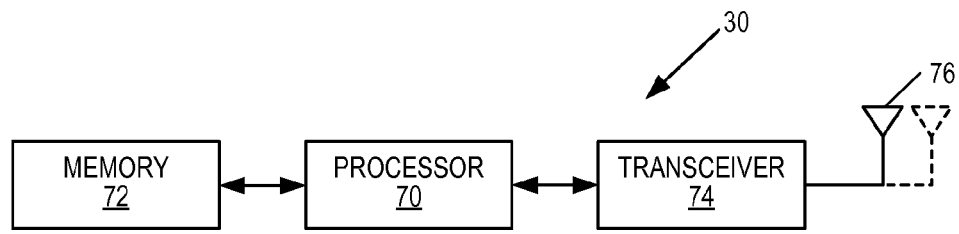
FIG. 15 is a block diagram of one of the wireless devices of FIG. 6 according to one embodiment of the present disclosure.

While the wireless devices 30 may be implemented in any type of hardware or any combination of hardware and software, FIG. 15 is a block diagram of one of the wireless devices 30 according to one embodiment of the present disclosure. As illustrated, the wireless device 30 includes a processor 70, memory 72, and a transceiver 74 coupled to one or more antennas 76. In particular embodiments, some or all of the functionality described above as being provided by the wireless device 30 may be provided by the processor 70 executing instructions stored on a computer-readable medium, such as the memory 72. Alternative embodiments of the wireless device 30 may include additional components responsible for providing additional functionality, including any of the functionality identified above and/or any functionality necessary to support the embodiments described above.

In one embodiment, a computer program including instructions which, when executed by at least one processor, cause the at least one processor to carry out the functionality of a wireless device 30 according to any one of the embodiments described herein is provided. In one embodiment, a carrier containing the aforementioned computer program product is provided. The carrier is one of an electronic signal, an optical signal, a radio signal, or a computer-readable storage medium (e.g., a non-transitory computer-readable medium such as the memory 72).

Figure 16:
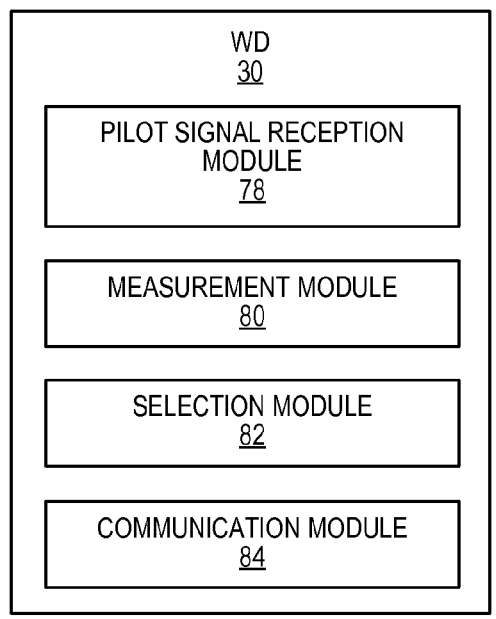
FIG. 16 is a block diagram of one of the wireless devices of FIG. 6 according to another embodiment of the present disclosure.

FIG. 16 is a functional block diagram of one of the wireless devices 30 according to one embodiment of the present disclosure. As illustrated, the wireless device 30 includes a pilot signal reception module 78, a measurement module 80, a selection module 82, and a communication module 84, each of which is implemented in software. The pilot signal reception module 78 operates to receive or detect the primary pilot signal and the probing pilot signals. The measurement module 80 operates to generate the channel measurements for the detected transmission nodes in the combined cell and, in some embodiments, report the channel measurements to the combined cell (e.g., via the communication module 84). The selection module 82 operates to, in some embodiments, receive the information that identifies the probing pilot signals to be utilized by the wireless device 30 (e.g., via the communication module 84) and select the recommended combination of transmission nodes for the wireless device 30 in the combined cell and report the recommended combination to the combined cell (e.g., via the communication module 84). In other embodiments (e.g., the embodiment of FIG. 10), the selection module 82 operates to select the desired or best combination of transmission nodes for the wireless device 30 based on the channel measurements generated by the measurement module 80. Lastly, the communication module 84 enables wireless communication (e.g., transmission and reception) between the wireless device 30 and the combined cell.

Embodiments disclosed herein may be implemented to provide numerous advantages. In some embodiments, the macro node 22 and the LPNs 26 cooperate to achieve spatial re-use gain and MIMO gain (i.e., diversity gain and/or multiplexing gain). As such, capacity can be improved at high loads.

The following acronyms are used throughout this disclosure.

3GPP Third Generation Partnership Project
5G Fifth Generation
CQI Channel Quality Indication
F-CPICH Fractional Common Pilot Channel
GSM Global System for Mobile Communications
HARQ Hybrid Automatic Repeat Request
HSDPA High Speed Downlink Packet Access
HS-DPCCH High Speed Dedicated Physical Control Channel
HS-SCCH High Speed Shared Control Channel
HSPA High Speed Packet Access
HSPA+ Evolved High Speed Packet Access
HS-PDSCH High Speed Physical Downlink Shared Channel
ID Identifier
LPN Low-Power Node
LTE Long Term Evolution
MIMO Multiple-Input-Multiple-Output
P-CPICH Primary Common Pilot Channel
RNC Radio Network Controller
RRC Radio Resource Control
RSRP Reference Signal Received Power
RSRQ Reference Signal Received Quality
RSSI Received Signal Strength Indicator
SF Spreading Factor
SFN Single Frequency Network
UE User Equipment
WCDMA Wideband Code Division Multiple Access Those skilled in the art will recognize improvements and modifications to the embodiments of the present disclosure. All such improvements and modifications are considered within the scope of the concepts disclosed herein and the claims that follow.

What is claimed is:

1. A method of operation of a wireless device in a combined cell deployment of a heterogeneous cellular communications network, comprising:

receiving a plurality of node-specific pilot signals from a plurality of nodes in a combined cell in the heterogeneous cellular communications network, wherein:
the plurality of nodes in the combined cell is a subset of a set of all nodes in the combined cell from which the wireless device detects the corresponding node-specific pilot signals, the set of all nodes in the combined cell comprising a combination of a high-power node and at least one low-power node having a same cell identifier and transmitting different node-specific pilot signals;
each node-specific pilot signal of the plurality of node-specific pilot signals is transmitted by a different one of the plurality of nodes in the combined cell; and
the high-power node also transmits a primary pilot signal for the combined cell;
generating a plurality of channel measurements based on the plurality of node-specific pilot signals, the plurality of channel measurements comprising, for each node of the plurality of nodes, a separate channel measurement generated based on the node-specific pilot signal transmitted by the node;
providing the plurality of channel measurements to the central control node for the combined cell;
receiving information from the central control node that is indicative of a subset of the plurality of node-specific pilot signals to be utilized by the wireless device;
selecting, from a subset of the plurality of nodes corresponding to the subset of the plurality of node-specific pilot signals indicated by the information received from the central node, a recommended node or combination of nodes for downlink transmission to the wireless device;
providing an indication of the recommended node or combination of nodes to a central control node for the combined cell; and
receiving a downlink transmission from a select combination of nodes using a distributed Multiple-Input-Multiple-Output, MIMO, reception technique, the select combination of nodes being a subset of the plurality of nodes selected by the central control node based on the recommended node or combination of nodes indicated to the central control node.

2. The method of claim 1 wherein the recommended node or combination of nodes is a recommended combination of two or more nodes.

3. The method of claim 1 wherein the recommended node or combination of nodes is a recommended node.

4. The method of claim 1 wherein selecting the recommended node or combination of nodes comprises:
estimating a channel capacity for each of a plurality of possible combinations of nodes from the subset of the plurality of nodes; and
selecting the node or possible combination having a highest channel capacity as the recommended node or combination of nodes.

5. The method of claim 4 wherein the plurality of possible combinations of nodes includes all possible combinations of $N_{RX,ANT}$ nodes from the subset of the plurality of nodes, wherein $N_{RX,ANT}$ is a number of receive antennas of the wireless device and is greater than or equal to 2.

6. The method of claim 5 wherein the plurality of possible combinations of nodes includes all possible combinations of one node from the subset of the plurality of nodes.

7. The method of claim 1 wherein the heterogeneous cellular communications network is a heterogeneous deployment of an evolved High Speed Packet Access, HSPA+, network.

8. The method of claim 7 wherein the plurality of node-specific pilot signals are Fractional Common Pilot Channel (F-CPICH) signals.

9. The method of claim 8 wherein each F-CPICH signal is characterized by a combination of a spreading code and a scrambling code that is unique to a corresponding one of the plurality of nodes within the combined cell.

10. The method of claim 9 wherein the primary pilot signal for the combined cell is a Primary Common Pilot Channel, P-CPICH, signal that is specific to the combined cell.

11. The method of claim 7 wherein providing the plurality of channel measurements to the central control node comprises transmitting a High Speed Dedicated Physical Control Channel, HS-DPCCH, comprising the plurality of channel measurements.

12. The method of claim 7 wherein providing the indication of the recommended node or combination of nodes to the central control node comprises transmitting a High Speed Dedicated Physical Control Channel, HS-DPCCH, comprising the indication of the recommended node or combination of nodes.

13. The method of claim 1 wherein receiving the information that is indicative of the subset of the plurality of node-specific pilot signals to be utilized by the wireless device comprises receiving the information via downlink signaling.

14. The method of claim 1 wherein the plurality of channel measurements is a plurality of Channel Quality Indication, CQI, measurements.

15. The method of claim 1 wherein each different node-specific pilot signal has a different characteristic from other node-specific pilot signals, the different characteristic comprising a combination of a spreading code and a scrambling code that is unique to a corresponding one of the plurality of nodes in the combined cell.

16. A wireless device, comprising:
a transceiver adapted to communicatively couple the wireless device to a combined cell in a heterogeneous cellular communications network;
a processor associated with the transceiver; and
memory containing instructions executable by the processor whereby the wireless device is adapted to:
receive, via the transceiver, a plurality of node-specific pilot signals from a plurality of nodes in the combined cell, wherein:
the plurality of nodes in the combined cell is a subset of a set of all nodes in the combined cell from which the wireless device detects the corresponding node-specific pilot signals, the set of all nodes in the combined cell comprising a combination of a high-power node and at least one low-power node having a same cell identifier and transmitting different node-specific pilot signals;
each node-specific pilot signal of the plurality of node-specific pilot signals is transmitted by a different one of the plurality of nodes in the combined cell; and
the high-power node also transmits a primary pilot signal for the combined cell;
generate a plurality of channel measurements based on the plurality of node-specific pilot signals, the plurality of channel measurements comprising, for each node of the plurality of nodes, a separate channel measurement generated based on the node-specific pilot signal transmitted by the node;
provide the plurality of channel measurements to the central control node for the combined cell;
receive information from the central control node that is indicative of a subset of the plurality of node-specific pilot signals to be utilized by the wireless device;
select, from a subset of the plurality of nodes corresponding to the subset of the plurality of node-specific pilot signals indicated by the information received from the central node, a recommended node or combination of nodes for downlink transmission to the wireless device;
provide an indication of the desired node or combination of nodes to a central control node for the combined cell via the transceiver; and
receive a downlink transmission from a select combination of nodes using a distributed Multiple-Input-Multiple-Output, MIMO, reception technique, the select combination of nodes being a subset of the plurality of nodes selected by the central control node based on the recommended node or combination of nodes indicated to the central control node.

17. A method of operation of a central control node of a combined cell in a heterogeneous cellular communications network, comprising:
receiving, from a wireless device, a plurality of channel measurements for a plurality of nodes in the combined cell measured using node-specific pilot signals, the plurality of channel measurements comprising, for each node of the plurality of nodes in the combined cell, a separate channel measurement for a channel between the node and the wireless device, wherein:
the plurality of nodes in the combined cell is a subset of a set of all nodes in the combined cell from which the wireless device detects the corresponding node-specific pilot signals, the set of all nodes in the combined cell comprising a combination of a high-power node and at least one low-power node having a same cell identifier and transmitting different node-specific pilot signals, each node-specific pilot signal being transmitted by a different one of the plurality of nodes in the combined cell; and
the high-power node also transmits a primary pilot signal for the combined cell;
selecting a subset of the plurality of nodes to be utilized by the wireless device based on the plurality of channel measurements;
providing information that is indicative of the subset of the plurality of nodes to the wireless device;
receiving, from the wireless device, a recommended node or combination of nodes for downlink transmission to the wireless device, the recommended node or combination of nodes being a node or combination of nodes from the subset of the plurality of nodes in the combined cell;
selecting one or more nodes for downlink transmission to the wireless device based on the recommended node or combination of nodes received from the wireless device; and
causing downlink transmission to the wireless device from the one or more nodes selected for downlink transmission to the wireless device.

18. The method of claim 17 wherein selecting the one or more nodes for downlink transmission to the wireless device comprises selecting the recommended node or combination of nodes received from the wireless device.

19. The method of claim 18 wherein the recommended node or combination of nodes is a combination of two or more nodes, and causing downlink transmission to the wireless device comprises causing a distributed Multiple-Input-Multiple-Output, MIMO, downlink transmission to the wireless device from the combination of two or more nodes.

20. The method of claim 17 wherein the plurality of channel measurements is a plurality of Channel Quality Indication, CQI, measurements, and selecting the subset of the plurality of nodes comprises selecting a subset of the plurality of nodes having CQI measurements that are greater than a predefined threshold.

21. A central control node for a combined cell in a heterogeneous cellular communications network, comprising:
   a processor; and
   memory containing software instructions executable by the processor whereby the processor is operative to:
      receive, from a wireless device, a plurality of channel measurements for a plurality of nodes in the combined cell measured using node-specific pilot signals, the plurality of channel measurements comprising, for each node of the plurality of nodes in the combined cell, a separate channel measurement for a channel between the node and the wireless device, wherein:
         the plurality of nodes in the combined cell is a subset of all nodes in the combined cell from which the wireless device detects the corresponding node-specific pilot signals, the set of all nodes in the combined cell comprising a combination of a high-power node and at least one low-power node having a same cell identifier and transmitting different node-specific pilot signals, each node-specific pilot signal being transmitted by a different one of the plurality of nodes in the combined cell; and
      the high-power node also transmits a primary pilot signal for the combined cell;
      select a subset of the plurality of nodes to be utilized by the wireless device based on the plurality of channel measurements;
      provide information that is indicative of the subset of the plurality of nodes to the wireless device;
      receive, from the wireless device, a recommended node or combination of nodes for downlink transmission to the wireless device, the recommended node or combination of nodes being a node or combination of nodes from the subset of the plurality of nodes in the combined cell;
      select one or more nodes for downlink transmission to the wireless device based on the recommended node or combination of nodes received from the wireless device; and
      cause downlink transmission to the wireless device from the one or more nodes selected for downlink transmission to the wireless device.

* * * * *